US009819910B2

(12) United States Patent
Huang et al.

(10) Patent No.: US 9,819,910 B2
(45) Date of Patent: Nov. 14, 2017

(54) SMART SYSTEM POWERED BY LIGHT SOCKET

(71) Applicants: Yi Huang, Cupertino, CA (US); Joshua Huang, Cupertino, CA (US); Jonathan Huang, Cupertino, CA (US)

(72) Inventors: Yi Huang, Cupertino, CA (US); Joshua Huang, Cupertino, CA (US); Jonathan Huang, Cupertino, CA (US)

(73) Assignee: Bao Tran, Saratoga, CA (US)

( * ) Notice: Subject to any disclaimer, the term of this patent is extended or adjusted under 35 U.S.C. 154(b) by 190 days.

(21) Appl. No.: 14/310,206

(22) Filed: Jun. 20, 2014

(65) Prior Publication Data
US 2015/0373307 A1 Dec. 24, 2015

(51) Int. Cl.
| *H04N 7/18* | (2006.01) |
| *H04B 3/54* | (2006.01) |
| *G05B 15/02* | (2006.01) |
| *H05B 37/02* | (2006.01) |
| *H04N 5/225* | (2006.01) |
| *G08B 13/196* | (2006.01) |
| *G08B 17/113* | (2006.01) |

(52) U.S. Cl.
CPC ............ *H04N 7/183* (2013.01); *G05B 15/02* (2013.01); *G08B 13/19632* (2013.01); *G08B 17/113* (2013.01); *H04B 3/54* (2013.01); *H04N 5/2251* (2013.01); *H05B 37/0263* (2013.01)

(58) Field of Classification Search
None
See application file for complete search history.

(56) References Cited

U.S. PATENT DOCUMENTS

| 5,186,659 | A | 2/1993 | Hefner | |
| 6,528,954 | B1* | 3/2003 | Lys | A61N 5/0616 |
| | | | | 315/158 |
| 7,901,116 | B2 | 3/2011 | Mathews | |
| 2003/0050737 | A1* | 3/2003 | Osann, Jr. | G05B 15/02 |
| | | | | 700/276 |
| 2005/0184867 | A1* | 8/2005 | Osann, Jr. | G06Q 50/06 |
| | | | | 340/539.25 |
| 2005/0185398 | A1* | 8/2005 | Scannell, Jr. | A01G 9/02 |
| | | | | 362/227 |
| 2010/0141153 | A1* | 6/2010 | Recker | H05B 33/0803 |
| | | | | 315/149 |
| 2011/0288964 | A1* | 11/2011 | Linder | B25J 9/1689 |
| | | | | 705/27.1 |
| 2012/0080944 | A1* | 4/2012 | Recker | H02J 9/02 |
| | | | | 307/25 |
| 2014/0045549 | A1* | 2/2014 | Ryan | H04N 5/3532 |
| | | | | 455/556.1 |
| 2015/0022357 | A1* | 1/2015 | Gettings | G01N 21/84 |
| | | | | 340/568.1 |

* cited by examiner

*Primary Examiner* — Chikaodili E Anyikire
(74) *Attorney, Agent, or Firm* — Tran & Associates (57) ABSTRACT

A smart system includes a connector plug that fits into a bulb socket; a processor to control the smart system; and at least one of a receiver and a transmitter coupled to the processor for receiving or transmitting data.

21 Claims, 6 Drawing Sheets

SMART SYSTEM POWERED BY LIGHT SOCKET

1. FIELD OF THE INVENTION

The present invention generally relates to a smart system controlling the smart house, office and smart car powered by a standard light bulb socket and fluorescent socket.

2. BACKGROUND

Figure 1:
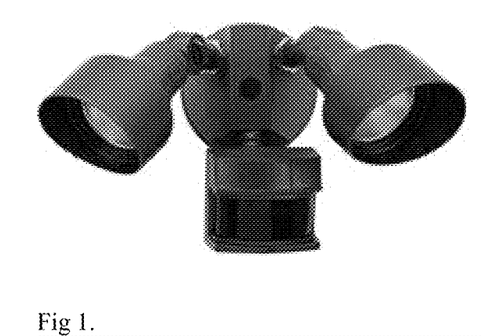
FIGS. 1-3 show exemplary conventional security camera systems.
Figure 2:
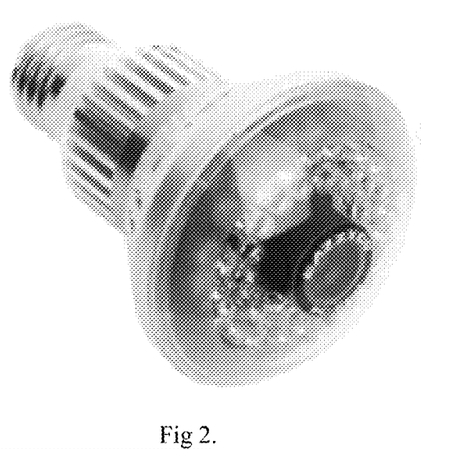
Figure 3:
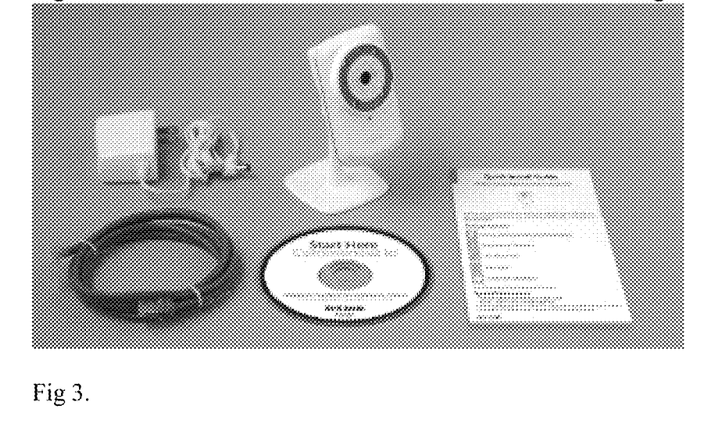

The development of the technology for a system to control the smart house and the smart office is advancing. FIGS. 1-3 show various conventional security camera devices. Some device is ready to use by using the extra wiring effort. For example, a conventional security camera with motion detection can be installed by removing an existing lighting fixture and installing a new one. It is not an easy job for most of people and the existing light fixture is wasted. Another system allows the user to put a hidden camera with bulb and store the images into an SD card. However, there is no immediate way to notify the owner of an intrusion. Another system is a power outlet pluggable system instead of a bulb socket camera, but the user needs to find a way to fix the position of the camera.

U.S. Pat. No. 6,528,954 discloses a smart bulb where a processor can control current for different hue and color. U.S. Pat. No. 7,901,116 discloses data interface to the AC power line via light bulb socket, while U.S. Pat. No. 5,186,659 discloses a light bulb adapter.

SUMMARY

In one aspect, a smart system includes a connector plug that fits into a bulb socket; a system that include a processor to control the smart system; at least one of a receiver and a transmitter coupled to the processor for receiving or transmitting data.

In another aspect, a smart system includes a connector plug that fits into bulb socket or fluorescent socket; a processor to control the smart system; and at least one of a receiver and a transmitter coupled to the processor for receiving or transmitting data, and at least one of function or circuit to convert AC power to DC power.

In yet another aspect, a smart system includes a connector plug that fits into bulb socket or fluorescent socket; a processor to control the smart system; at least one of a receiver and a transmitter coupled to the processor for receiving or transmitting data; at least one of function or circuit to convert AC power to DC power; and at least one of function is a camera to capture image.

In yet another aspect, a smart system includes a connector plug that fits into bulb socket or fluorescent socket; a processor to control the smart system including light, alarms, communication, camera; at least one of a receiver and a transmitter coupled to the processor for receiving or transmitting data; at least one of the transceiver is communicating through power line; at least one of expandable socket which can connect to other device, the socket could be light socket; other socket (port) is USB.

In another aspect, a smart system includes a connector plug that fits into bulb socket or fluorescent socket; at least one of a receiver and a transmitter is for power line communication; at least one bulb or one bulb socket is for lighting.

In yet another aspect, a smart system includes a connector plug that fits into bulb socket or fluorescent socket; at least one of a receiver and a transmitter is for power line communication; at least one bulb or one bulb socket for lighting, and at least a camera to capture picture.

In yet another aspect, a smart system includes a connector plug that fits into bulb socket or fluorescent socket; at least one of a receiver and a transmitter is for power line communication.

In yet another aspect, a smart system includes a connector plug that fits into bulb socket or fluorescent socket; at least one of a receiver and a transmitter is for power line communication; and at least one of a receiver and a transmitter is for WiFi to support wireless communication.

In yet another aspect, a smart system includes a connector plug that fits into bulb socket or fluorescent socket; and at least one bulb or one bulb socket for lighting; and a camera to capture image (including audio); and a processor to analyze image (including audio) or a controller sends to other device to analyze image (including audio); and a module detects motion and sends information to processor or controller. The result could be use as a signal for recording or power on/off control of partial of the smart system.

In yet another aspect, a facility with a plurality of smart systems, each smart system has a connector plug that fits into bulb socket or fluorescent socket, the system including a smart "device" is a master of a group of smart system, to control the slave smart system and a slave smart system that provides feedback data to master smart "device", wherein each smart system has at least one of a receiver and a transmitter coupled to the processor for receiving or transmitting data. The master smart device may be a smart system, a server, a PC, a tablet or a smart phone or a group of above devices.

Implementations of the above aspect may include one or more of the following. The bulb socket could be E12, E14, E26, E27, E28, E39, E40, B22, G4, G9, Gu10, K9, T8, T12 or various type of connectors. A camera device can capture image or video. The wireless device can support blue tooth, WiFi, ibeacon, infrared, 3G, LTE among others. A power line communication device can provide communication through the power line. A GPS can be used to tell the location of the system. A storage device can store configuration data, history event, image or video data. An extendable plug socket can be provided for lights. A USB, mini USB plug socket can be provided to allow access to USB peripherals. The system can include sensor such as carbon monoxide detector, smoke detector, and motion detector, thermal sensor, infrared sensor, among others. The system can capture images of the building to guide robot or robots to clean up house and floor. The system can capture images and detect the intruder and send message through the transceiver. The system can capture images and detect people falling down or getting sick and send message through the transceiver. The system can include audio in/out function. The receiver and transmitter support one or more of: Bluetooth, WiFi, WiMax, Zigbee, iBeacon, infrared, 3G, 4G, 5G, LTE communication, and power line communication.

Advantages of the above systems may include one or more of the following. The system helps you to power your smart device by using the existing light socket. The system also saves your time to wire your power lines. It is a pluggable smart system to your existing light socket. The smart system includes the communication functions, computing, control functions and detecting functions. For expandable future use, the system can allow to connect to other device through USB and extendable socket. Beside the advantages of the pluggable system, the system can operate on images captured by the camera, including face recognition. If there are any intruders come in, the system can detect that it is a stranger coming to the property and will notify the owner through email, message, phone call or intercom device. The owner can decide when he wants to trigger alarm or not. It actually provides two ways of communication. The smart system also can trigger alarm without owner's intervention by programmable setting. The smart system also can light up with different colors and light up patterns of a group of light bulbs to welcome the owner. Moreover, it can trigger music or audio system to play songs or talk. Another advantage of the pluggable system into the existing bulb socket as compared to a wall outlet is that there is no line cord or no visible line cord—the device is simply plugged into the socket. Second, the light bulb socket connector can ensure it is tightly connected. Third, a light bulb socket is likely to be available in many places of the house and office. The user can install a lot of smart devices through the existing socket. Fourth, our smart system can integrate with a bulb or support an extendable socket for future extension. The user can choose the models needed and there is no need to connect to a bulb immediately.

DESCRIPTION

Figure 4:
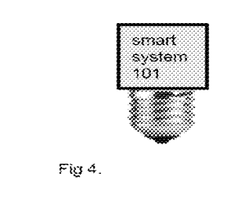
FIG. 4 shows the smart system with a power receiving base.

FIG. 4 shows the smart system with a power receiving base. The system connects to the smart system through a power receiving base.

Alternating current (AC) is used for power line transmission and for high power devices like appliances and lights. The characteristics of AC make it ideal for transmission over long lines and for delivering large amounts of power for relatively unregulated uses, such as generating heat and light. Lower power appliances and devices require the closely regulated control of direct current power (DC). As a normal house is supplied with AC, it must be converted to DC for many uses. The power from light socket original could be possible from AC power domain and the smart system is running in DC power domain. An AC to DC converter can be used to provide power to the electronics in the smart system. The smart system can also connect to DC power line without AC to DC converter, for example car system.

Light bulbs are usually inserted in lamp holder sockets which provide electrical connections to the lamp and support it in the lighting fixture. The use of sockets allows lamps to be safely and conveniently replaced (re-lamping) at the end of life, or to change power, color, lighting technology or etc. There are many different standards for these lamp holders, created by de facto and by various standards bodies. A general coding system is a letter or abbreviation followed by a number. Some miniature lamps have wire leads suitable for direct connection to wires; some reflector lamps have screw terminals for wire connections.

The construction of a lamp holder socket defines and limits its intended use. Ceramic insulation can withstand considerably higher operating temperatures than bakelite or other plastics. The electrical components and wires must be designed to carry the intended current plus a safety factor. The contact surface area, thickness and conductivity of the metal, connection methods and maximum operating temperature must all be considered in the design of a new socket. In addition, mechanical factors such as shape of the socket, fixture mounting and attachment, lamp support, ease of re-lamping and total cost of manufacture must be considered. Sockets designed for ordinary household and industrial use have much more design leeway than those used in precision applications.

The base must be located far enough from the filament that the metals with the lowest melting point will remain solid. Edison screw bases include:

Miniature E10 (Flashlight lamp)
Miniature E11
Candelabra E12
European E14
Intermediate E17
Medium E26/E27 (sizes are interchangeable)
3-Lite (modified medium or mogul socket with additional ring contact for 3-way lamps)
Mogul E40
Skirted (PAR-38)

Figure 5:
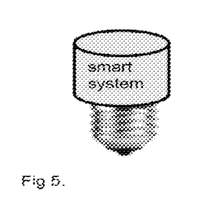
FIG. 5 shows the smart system with a power receiving base in cylinder shape.

FIG. 5 shows the smart system with a power receiving base in a cylinder shape. The characteristics of AC make it ideal for transmission over long lines and for delivering large amounts of power for relatively unregulated uses, such as generating heat and light. Lower power appliances and devices require the closely regulated control of direct current power (DC). As a normal house is supplied with AC, it must be converted to DC for many uses.

Figure 6:
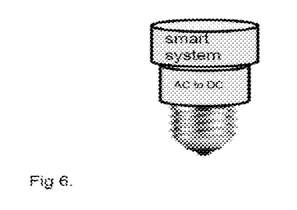
FIG. 6 shows the smart system equipped a power receiving base with an additional AC to DC converter.

FIG. 6 shows the smart system equipped a power receiving base with an additional AC to DC converter. As described above, the smart system is running in DC power domain. An AC to DC converter is used to connect to a socket which in turn connects to AC power line.

Figure 7:
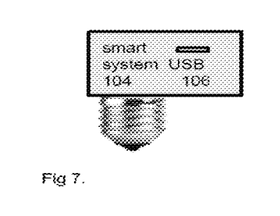
FIG. 7 shows the smart system in box shape equipped a power receiving base with an extended USB port.

FIG. 7 shows the smart system in box shape equipped a power receiving base with an extended Universal Serial Bus (USB) port. USB is an industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

The design architecture of USB is asymmetrical in its topology, consisting of a host, a multitude of downstream USB ports, and multiple peripheral devices connected in a tiered-star topology. Additional USB hubs may be included in the tiers, allowing branching into a tree structure with up to five tier levels. A USB host may implement multiple host controllers and each host controller may provide one or more USB ports. Up to 127 devices, including hub devices if present, may be connected to a single host controller. USB devices are linked in series through hubs. One hub—built into the host controller—is the root hub.

A physical USB device may consist of several logical sub-devices that are referred to as device functions. A single device may provide several functions, for example, a webcam (video device function) with a built-in microphone (audio device function). This kind of device is called a composite device. An alternative to this is compound device, in which the host assigns each logical device a distinctive address and all logical devices connect to a built-in hub that connects to the physical USB cable. USB endpoints actually reside on the connected device: the channels to the host are referred to as pipes, and USB device communication is based on pipes (logical channels). A pipe is a connection from the host controller to a logical entity, found on a device, and named an endpoint. Because pipes correspond 1-to-1 to endpoints, the terms are sometimes used interchangeably. A USB device could have up to 32 endpoints (16 IN, 16 OUT), though it's rare to have so many. An endpoint is defined and numbered by the device during initialization (the period after physical connection called "enumeration") and so is relatively permanent, whereas a pipe may be opened and closed.

The host controller directs traffic flow to devices, so no USB device can transfer any data on the bus without an explicit request from the host controller. In USB 2.0, the host controller polls the bus for traffic, usually in a round-robin fashion. The throughput of each USB port is determined by the slower speed of either the USB port or the USB device connected to the port.

USB implements connections to storage devices using a set of standards called the USB mass storage device class (MSC or UMS). This was at first intended for traditional magnetic and optical drives and has been extended to support flash drives. It has also been extended to support a wide variety of novel devices as many systems can be controlled with the familiar metaphor of file manipulation within directories. The process of making a novel device look like a familiar device is also known as extension. [citation needed] The ability to boot a write-locked SD card with a USB adapter is particularly advantageous for maintaining the integrity and non-corruptible, pristine state of the booting medium.

Figure 8:
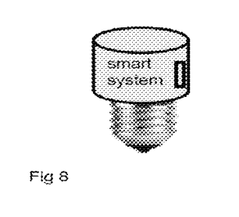
FIG. 8 shows the smart system in cylinder shape equipped a power receiving base with an extended USB port.
Figure 9:
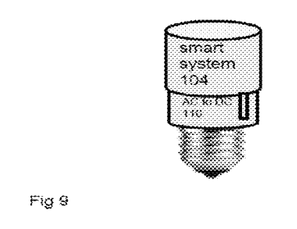
FIG. 9 shows the smart system equipped a power receiving base with an AC to DC converter and a USB port connected to AC to DC converter.

FIG. 8 shows the smart system in cylinder shape equipped a power receiving base with an extended USB port, while FIG. 9 shows the smart system equipped a power receiving base with an AC to DC converter and a USB port connected to AC to DC converter. The USB 1.x and 2.0 specifications provide a 5 V supply on a single wire to power connected USB devices. The specification provides for no more than 5.25 V and no less than 4.75 V (5 V±5%) between the positive and negative bus power lines (VBUS voltage). For USB 3.0, the voltage supplied by low-powered hub ports is 4.45-5.25 V. A unit load is defined as 100 mA in USB 2.0, and 150 mA in USB 3.0. A device may draw a maximum of five unit loads (500 mA) from a port in USB 2.0, or six unit loads (900 mA) in USB 3.0. There are two types of devices: low-power and high-power. A low-power device (such as a USB HID) draws at most one-unit load, with minimum operating voltage of 4.4 V in USB 2.0, and 4 V in USB 3.0. A high-power device draws, at most, the maximum number of unit loads the standard permits.

The USB Battery Charging Specification Revision 1.1 (released in 2007) defines new types of USB ports, charging ports. As compared to standard downstream ports, where a portable device can only draw more than 100 mA current after digital negotiation with the host or hub, charging ports can supply currents between 500 mA and 1.5 A without digital negotiation. A charging port supplies up to 500 mA at 5 V, up to the rated current at 3.6 V or more, and drop its output voltage if the portable device attempts to draw more than the rated current. The charger port may shut down if the load is too high.

Two types of charging ports exist: charging downstream ports (CDP), supporting data transfers as well, and dedicated charging ports (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).

Before the battery charging specification was defined, there was no standardized way for the portable device to inquire how much current was available. For example, Apple's iPod and iPhone chargers indicate the available current by voltages on the D− and D+ lines. When D+=D−= 2.0 V, the device may pull up to 500 mA. When D+=2.0 V and D−=2.8 V, the device may pull up to 1 A of current. When D+=2.8 V and D−=2.0 V, the device may pull up to 2 A of current.

Dedicated charging ports can be found on USB power adapters that convert utility power or another power source (e.g., a car's electrical system) to run attached devices and battery packs. On a host (such as a laptop computer) with both standard and charging USB ports, the charging ports should be labeled as such.

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time. The USB Battery Charging Specification Revision 1.2 (released in 2010) makes clear that there are safety limits to the rated current at 5 A coming from USB 2.0. On the other hand, several changes are made and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms.

Sleep-and-charge USB ports can be used to charge electronic devices even when the computer is switched off. Normally, when a computer is powered off, the USB ports are powered down. This prevents phones and other devices from being able to charge unless the computer is powered on. Sleep-and-charge USB ports remain powered even when the computer is off. On laptops, charging devices from the USB port when it is not being powered from AC drains the laptop battery faster; most laptops have a facility to stop charging if their own battery charge level gets too low. Desktop machines need to remain plugged into AC power for Sleep-and-charge to work.

Figure 10:
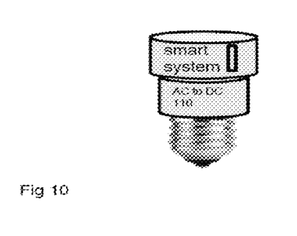
FIG. 10 shows the smart system equipped a power receiving base with an AC to DC converter and a USB port connect to smart system logic.

FIG. 10 shows the smart system equipped a power receiving base with an AC to DC converter and a USB port connect to smart system logic.

Figure 11:
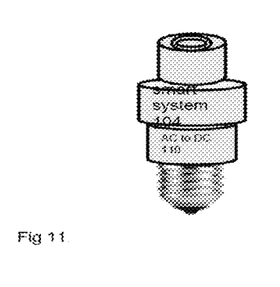
FIG. 11 shows the smart system equipped a power receiving base with an AC to DC converter and a bulb socket.
Figure 12:
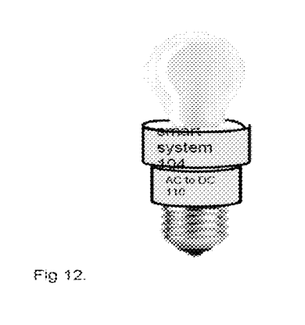
FIG. 12 shows the smart system equipped a power receiving base with an AC to DC converter and an integrated bulb.

FIG. 11 shows the smart system equipped a power receiving base with an AC to DC converter and a bulb socket while FIG. 12 shows the smart system equipped a power receiving base with an AC to DC converter and an integrated bulb.

Figure 13:
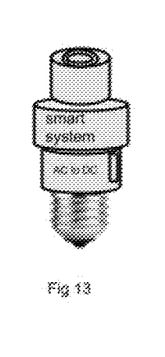
FIG. 13 shows the smart system equipped a power receiving base with an AC to DC converter and a bulb socket and a USB port.
Figure 14:
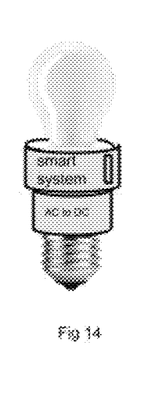
FIG. 14 shows the smart system equipped a power receiving base with an AC to DC converter and an integrated bulb and a USB port.

FIG. 13 shows the smart system equipped a power receiving base with an AC to DC converter and a bulb socket and a USB port. FIG. 14 shows the smart system equipped a power receiving base with an AC to DC converter and an integrated bulb and a USB port.

Figure 15:
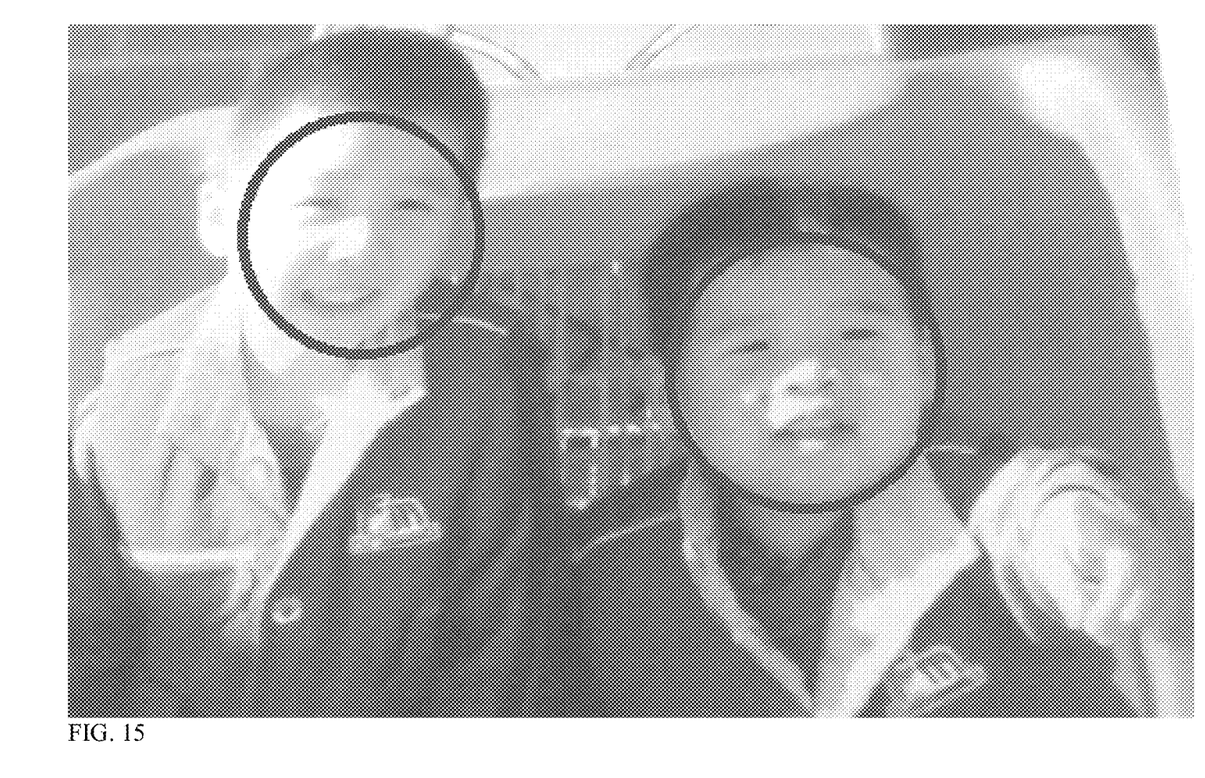
FIG. 15 shows the system can detect people and detect face.

FIG. 15 shows the system can detect people through face detection. Face detection is a computer technology that determines the locations and sizes of human faces in digital images. It detects face and ignores anything else, such as buildings, trees and bodies. Face detection can be regarded as a more general case of face localization. In face localization, the task is to find the locations and sizes of a known number of faces (usually one). In face detection, face is processed and matched bitwise with the underlying face image in the database. One embodiment uses OpenCV (Open Source Computer Vision) which is a library of programming functions mainly aimed at real-time computer vision, developed by Intel Russia research center in Nizhny Novgorod, and now supported by Willow Garage and Itseez. the library focuses mainly on real-time image processing. If the library finds Intel's Integrated Performance Primitives on the system, it will use these proprietary optimized routines to accelerate itself.

Pseudo-code for one exemplary embodiment for facial recognition is as follows:

```
/** @function detectAndDisplay */
void detectAndDisplay( Mat frame )
{
    std::vector<Rect> faces;
    Mat frame_gray;
    cvtColor( frame, frame_gray, CV_BGR2GRAY );
    equalizeHist( frame_gray, frame_gray );

//-- Detect faces
    face_cascade.detectMultiScale( frame_gray, faces, 1.1, 2, 0|CV_HAAR_SCALE_IMAGE, Size(30, 30) );
    for( size_t i = 0; i < faces.size( ); i++ )
    {
        Point center( faces[i].x + faces[i].width*0.5, faces[i].y +
            faces[i].height*0.5 ); ellipse( frame, center, Size(
        faces[i].width*0.5, faces[i].height*0.5), 0, 0, 360, Scalar( 255, 0, 255 ), 4,
        8, 0 );
        Mat faceROI = frame_gray( faces[i] );
        std::vector<Rect> eyes;
        //-- In each face, detect eyes
        eyes_cascade.detectMultiScale( faceROI, eyes, 1.1, 2, 0
        |CV_HAAR_SCALE_IMAGE, Size(30, 30) );
        for( size_t j = 0; j < eyes.size( ); j++ )
        {
            Point center( faces[i].x + eyes[j].x + eyes[j].width*0.5,
            faces[i].y + eyes[j].y + eyes[j].height*0.5 );
                int radius = cvRound( (eyes[j].width + eyes[j].height)*0.25
                ); circle( frame, center, radius, Scalar( 255, 0, 0 ), 4, 8, 0 );
        }
    }
    //-- Show what you got
    imshow( window_name, frame );
}
```

Figure 16:
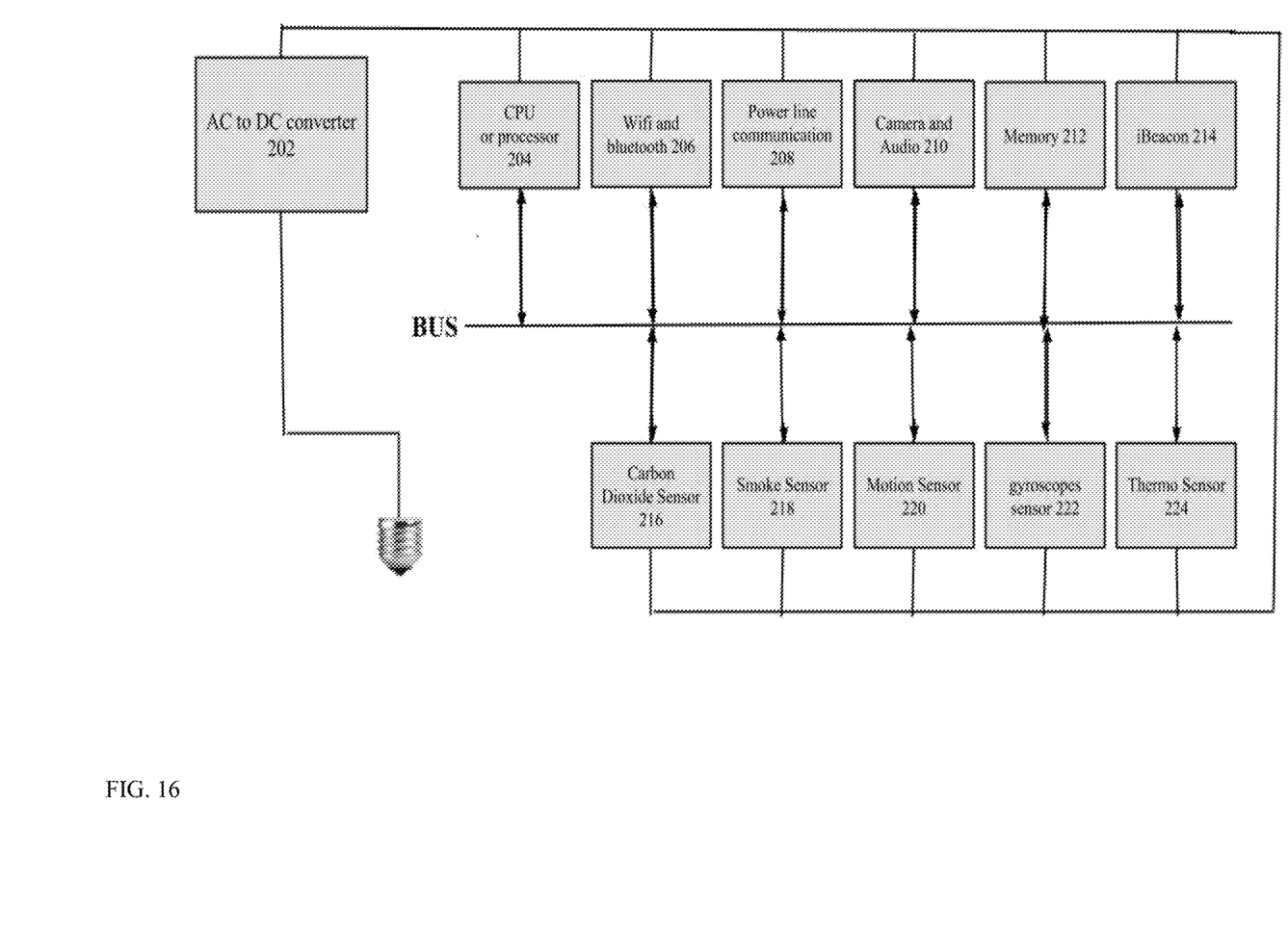
FIG. 16 shows an exemplary smart system for processing input information from camera, WiFi, Bluetooth, power line communication or sensors.

FIG. 16 shows an exemplary hardware supporting the smart system. The smart system can compute the input information from camera, WiFi, Bluetooth, power line communication or sensors. After calculating, the smart system can send out data to server or router through power line communication, Bluetooth or WiFi. The system includes a converter 202, a processor 204, Bluetooth or WiFi transceiver 206, powerline communicator 208, camera and audio unit 210, memory 212, iBeacon unit 214, carbon dioxide sensor 216, smoke sensor 218, motion sensor 220, gyroscope 222, and thermal sensor 224. Details of each are discussed next.

For an AC to DC converter, voltage to provide LED could be higher than 5 volts to increase the lumens. For the smart system, voltage can be lower than 5 volts. One embodiment allows AC convert to DC and moreover it converts to different levels of volts.

For motion sensor, it could control the power of camera or it actives other module to function. Different sensors can be used, for example:
Passive infrared (PIR)—Passive infrared sensors detect a person's body heat as it changes against the background. No energy is emitted from the sensor.
Microwave—A microwave sensor sends out electromagnetic pulses and measures the changes in frequency (Doppler) due to reflection off a moving object.
Other Sensor—There are other types of motion sensor as well like ultrasonic and Topographic motion detector, among others.

The system can use combinations of different sensor technologies. Using combination of multiple sensing technologies into one detector can help to reduce false triggering.

A digital camera can be used to capture image to identify the intruders or any dangerous events happens. For more advanced application, the camera could capture the images with depth information to reconstruct 3D images. the camera could help and provide guidance to Robot for cleaning up a house. It can also apply to face recognition when camera capture images, the processor can try to analyze the image with existing database to identify the name of the people. If it is a stranger, the system can capture the image and trigger alarm or send image to the owner.

An audio module can serve as door bell when guest come to your house. It combines with the outdoor security camera to talk to people who is inside the house to ask permission to come to your house like an intercom device.

A power line communication (PLC) is provided to transfer image to cloud or a smart phone when WiFi is weak in accessible. For example, if the WiFi signal is not strong enough, PLC helps to transfer image to network router or switch. The most useful application is using as a security camera. It sends the images through a power line and eventually connects to internet when there is an event like detecting someone or big animal coming to the house. The smart system brings a Power line communication and wireless function to the smart house or smart office. It saves the work to connect ethernet from a place to place. Especially for an office, originally you connect ethernet at the corner of cubic board. For the wireless service, you might connect it through attic. It really cost a lot when you restructure your cubic area. You might need to reroute the ethernet. In our invention, the PLC provides a new way to save the work.

For an iBeacon application, the smart system can serve as in a mall to give the map guidance or send the advertisement to people's smart phone when people walk nearby.

For gyroscope and accelerometer helps to trigger alarm when earthquake is coming or building structure is tilting.

For other application, the smart system can serve as smoke and carbon dioxide detector.

For CO detector can detect colorless, tasteless and odorless gas. The CO gas is a highly toxic inhalant and attaches to the hemoglobin with an affinity 200× stronger than oxygen, producing inadequate amounts of oxygen traveling through the body. For Smoke detector is a device to detect smoke. In North America, CO and Smoke detector are required in building and houses. In our system, the system is equipped with an internal rechargeable battery backup that recharges when the detector is receiving AC power.

The system can also allow users to adjust the hue and brightness through WiFi or bluetooth in a smart phone. In one embodiment, the system uses Artificial Intelligence to detect motion of objects and detect any people are still in the room. If people is sitting to watch TV, the smart system can identify people are in the room and make the adjustment on the brightness. If people are leaving, it adjusts light to power saving mode or even turn it off. If people come to the room, there are at least two different modes. One mode is for people just walk through and bypass.

The light will be turn on to certain level as walking through mode. The other mode is people coming to the room and staying at that room. The brightness level can be set as different level. Once these settings are done, the smart system can operate automatically. There could be another application that the light listen to the music and give different pattern according to the mood of the music. The light can also turn into other pattern when the intruder comes or emergent event happens.

Figure 17:
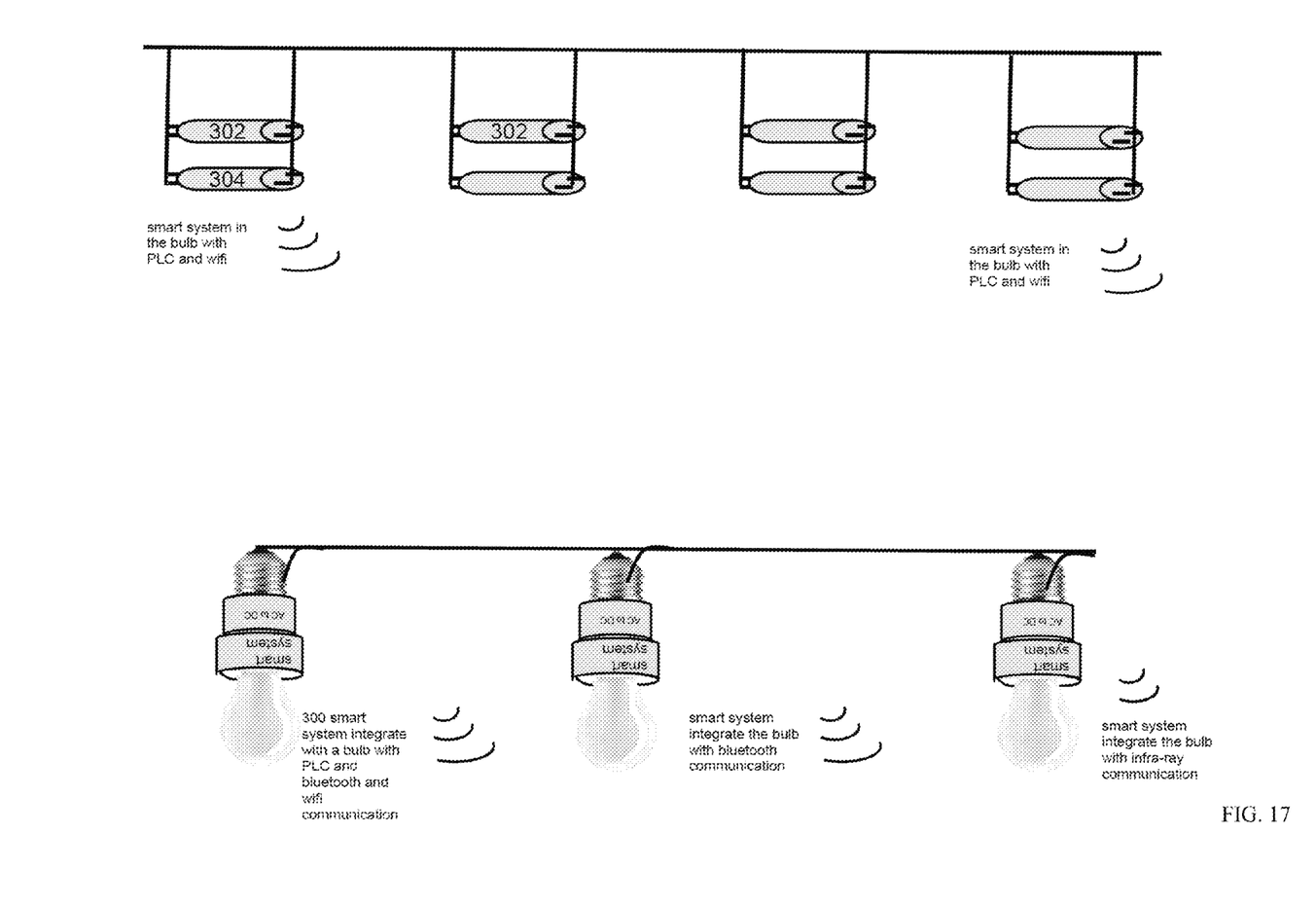
FIG. 17 shows an exemplary smart system with bulb, PLC and WiFi.

FIG. 17 shows an exemplary smart system with bulb, PLC and WiFi. In this embodiment, an office may have a plurality of bulbs with PLC, a subset will have bulb 300 with PLC 302 and WiFi module 304. In other embodiments, a mixture of protocols can be used. For example, as shown in the bottom of FIG. 17, the communication standards include PLC, Bluetooth, WiFi, and Infrared communication protocols.

The smart system can work independently. It can also work together and send information to other smart device through transceiver. For the complicate calculation, smart system can send information to cloud and cloud can gather information of each smart system and give the feedback or send control information back to smart system.

The smart system can have different functions or different set of modules; they can work as master and slave mode. A few of smart system serve as a master of a group of smart systems. It can be programmable or fixed function in the hardware.

They also can work in synergy with other smart system with different functions. Some of smart systems can serve as security light, some of smart systems can serve as green energy light and some of the smart systems have Artificial intelligence to recognize people. They can work together to form a big smart home system.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Those skilled in the art will readily observe that numerous modifications and alterations of the device or system and method may be made while retaining the teachings of the invention. Accordingly, the above disclosure should be construed as limited only by the meters and bounds of the appended claims.

What is claimed is:

1. A system to receive a user replaceable ordinary bulb, comprising:
   a smart plug adapter to be electrically coupled with a bulb socket and adapted to receive the user replaceable ordinary bulb;
   the plug adapter includes a transceiver and is coupled to at least one sensor from one of a camera, a smoke detector, a motion detector, a thermal sensor, an infrared sensor; and
   the plug adapter coupled to the processor for receiving or transmitting image data, image feature data or final classification data to a cloud or a smart phone, wherein the camera detects an intruder and sends message through the transceiver, and
   a power line communication module, a wireless 802.11 radio frequency (RF) communication module, and an infrared communication module coupled to the transceiver to selectively send information using a combination of the power line, the RF communication, the infrared communication to a cloud, wherein the cloud gathers information of other plug adapter systems and sends control information to smart system, wherein the system works as master and slave mode and one or more smart systems serve as security lights, and one or more other plug adapter systems recognize people.

2. The system of claim 1, wherein the bulb socket comprises E12, E14, E26, E27, E28, E39, E40, B22, G4, G9, Gu10, K9, T8, T12 or suitable connector.

3. The system of claim 1, wherein the receiver and transmitter support one or more of: Bluetooth, WiFi, WiMax, Zigbee, iBeacon, infrared, 3G, 4G, 5G, LTE communication, and power line communication.

4. The system of claim 1, comprising a power line communication device can provide communication through the power line.

5. The system of claim 1, comprising a positioning system to determine a system location.

6. The system of claim 1, comprising a storage device to store one or more of:
   configuration data, history event, image or video data, OS, application, user data, identification data.

7. The system of claim 1, comprising an extendable plug socket for a lights bulb.

8. The system of claim 1, wherein USB, mini USB plug socket can be provided to allow access to USB peripherals.

9. The system of claim 1, comprising one or more bulbs in communication with the receiver and transmitter and coordinated to light up with different colors in a predetermined pattern as a group of light bulbs to welcome a person.

10. The system of claim 9, wherein the camera supports two way communication.

11. The system of claim 9, wherein the camera triggers music or audio system to play songs for a person or to communicate with a person.

12. The system of claim 9, comprising a charging port coupled to the bulb socket.

13. The system of claim 9, comprising a speaker and a microphone to provide audio in/out functions.

14. The system of claim 1, comprising a plurality of smart systems, each smart system has a connector plug that fits into bulb socket or fluorescent socket.

15. The system of claim 14, comprising a smart device acting as a master of a group of smart systems, to control one or more slave smart systems and a slave smart systems that provides feedback data to master smart device, wherein each smart system has at least one of a receiver and a transmitter coupled to the processor for receiving or transmitting data.

16. The system of claim 15, wherein the master smart device comprises one of: a smart system, a server, a PC, a tablet or a smart phone or a group of the devices.

17. A system, comprising:
   at least one connector plug adapter that fits into bulb socket or fluorescent socket;
   at least one processor in the plug adapter and to control the smart system coupled to a camera, a motion detector, a thermal sensor, and an infrared sensor;
   at least one of a receiver and a transmitter in the plug adapter and coupled to the processor for receiving or transmitting image data, image feature data or final classification data to cloud or a smart phone, wherein the camera detects people falling down or getting sick and sends message through the transceiver, and
   at least one of function or circuit to convert AC power to DC power, and
   a power line communication module, a wireless 802.11 communication module, and an infrared communication module coupled to the transceiver to send information to a cloud and the cloud gathers information of other smart systems and provide feedback or send control information to smart system, wherein the system works as master and slave mode and one or more smart systems serve as security lights, one or more smart systems serve as green energy lights and one or more smart systems have artificial intelligence to recognize people.

18. The system of claim 17, wherein the receiver and transmitter support one or more of: Bluetooth, WiFi, WiMax, Zigbee, iBeacon, infrared, 3G, 4G, 5G, LTE communication, and power line communication.

19. The system of claim 17, comprising a positioning system to determine a system location.

20. The system of claim 17, comprising a storage device to store configuration data, history event, image or video data.

21. A smart system, comprising:
   at least one connector plug adapter that fits into bulb socket or fluorescent socket;
   at least one processor in the plug adapter and to control the smart system wirelessly coupled to a motion detector, a thermal sensor, an infrared sensor;
   at least one of a receiver and a transmitter in the plug adapter and coupled to the processor for receiving or transmitting image data, image feature data or final classification data to cloud or a smart phone;
   a circuit to convert AC power to DC power in the plug adapter; and
   at least one camera to capture image, wherein the camera captures images of a building to guide a robot or robots to clean up house and floor, and
   a power line communication module, a wireless 802.11 communication module, and an infrared communication module coupled to the transceiver to send information to a cloud and the cloud gathers information of other smart systems and provide feedback or send control information to smart system, wherein the system works as master and slave mode and one or more smart systems serve as security lights, one or more smart systems serve as green energy lights and one or more smart systems have artificial intelligence to recognize people.

\* \* \* \* \*